United States Patent
Seo et al.

(10) Patent No.: US 10,756,864 B2
(45) Date of Patent: Aug. 25, 2020

(54) METHOD FOR TRANSMITTING OR RECEIVING SIGNAL IN WIRELESS COMMUNICATION SYSTEM AND DEVICE THEREFOR

(71) Applicant: LG ELECTRONICS INC., Seoul (KR)

(72) Inventors: Inkwon Seo, Seoul (KR); Kijun Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 16/073,207

(22) PCT Filed: Feb. 27, 2017

(86) PCT No.: PCT/KR2017/002128
§ 371 (c)(1),
(2) Date: Jul. 26, 2018

(87) PCT Pub. No.: WO2017/150855
PCT Pub. Date: Sep. 8, 2017

(65) Prior Publication Data
US 2019/0068341 A1 Feb. 28, 2019

Related U.S. Application Data

(60) Provisional application No. 62/303,348, filed on Mar. 3, 2016.

(51) Int. Cl.
*H04L 5/00* (2006.01)
*H04L 5/14* (2006.01)
(Continued)

(52) U.S. Cl.
CPC .......... *H04L 5/0048* (2013.01); *H04L 5/0091* (2013.01); *H04L 5/14* (2013.01);
(Continued)

(58) Field of Classification Search
None
See application file for complete search history.

(56) References Cited

U.S. PATENT DOCUMENTS

2013/0258975 A1 10/2013 Krishnamurthy et al.
2015/0103702 A1 4/2015 Lahetkangas et al.
(Continued)

FOREIGN PATENT DOCUMENTS

WO WO 2015/171046 A1 11/2015

OTHER PUBLICATIONS

Huawei et al., "Discussion on New Frame Structure for Latency Reduction in TDD," 3GPP TSG RAN WG1 Meeting #84, R1-160754, St. Julian's, Malta, Feb. 15-19, 2016, 9 pages.
(Continued)

*Primary Examiner* — Alex Skripnikov
*Assistant Examiner* — Sharmin Chowdhury
(74) *Attorney, Agent, or Firm* — Birch, Stewart, Kolasch & Birch, LLP

(57) ABSTRACT

According to one embodiment of the present invention, a method by which a terminal transmits a signal in a wireless communication system comprises the steps of: receiving timing advance (TA) information on a self-contained subframe having all of a downlink control region, a downlink data region, a guard period (GP) for transmission/reception switching, and an uplink control region; and transmitting uplink control information by advancing transmission timing corresponding to the uplink control region by the time length indicated by the TA information, wherein, when the time length indicated by the TA information is shorter than
(Continued)

a predetermined magnitude, the terminal can first transmit a specific uplink signal, and then transmit the uplink control information in a GP remaining period remaining after completion of the transmission/reception switching.

13 Claims, 11 Drawing Sheets

(51) Int. Cl.
  *H04W 72/04* (2009.01)
  *H04L 27/26* (2006.01)
  *H04B 7/06* (2006.01)
(52) U.S. Cl.
  CPC ... *H04W 72/0413* (2013.01); *H04W 72/0446* (2013.01); *H04B 7/0617* (2013.01); *H04L 5/0055* (2013.01); *H04L 5/0057* (2013.01); *H04L 27/26* (2013.01)

(56) References Cited

U.S. PATENT DOCUMENTS

2015/0327196 A1  11/2015  Blankenship et al.
2016/0338081 A1*  11/2016  Jiang ............... H04W 72/1205
2019/0069164 A1*  2/2019  Kishiyama ............ H04W 8/24

OTHER PUBLICATIONS

Huawei et al., "Remaining Details of Uplink Frame Structure Design," 3GPP TSG RAN WG1 Meeting #84, R1-160329, St. Julian's, Malta, Feb. 15-19, 2016, 8 pages.
Huawei et al., "Way Forward on Latency Reduction Based on Frame Structure 2," 3GPP TSG RAN WG1 #84, R1-161520, St. Julian's, Malta, Feb. 15-19, 2016, 3 pages.
Levanen et al., "Dense Small-Cell Networks: Rethinking the Radio Interface Beyond LTE-Advanced", 1st International Conference on 5G for Ubiquitous Connectivity (5GU), 2014, pp. 163-169.

* cited by examiner

METHOD FOR TRANSMITTING OR RECEIVING SIGNAL IN WIRELESS COMMUNICATION SYSTEM AND DEVICE THEREFOR

CROSS REFERENCE TO RELATED APPLICATIONS

This application is the National Phase of PCT International Application No. PCT/KR2017/002128, filed on Feb. 27, 2017, which claims priority under 35 U.S.C. 119(e) to U.S. Provisional Application No. 62/303,348, filed on Mar. 3, 2016, all of which are hereby expressly incorporated by reference into the present application.

TECHNICAL FIELD

The present invention relates to a wireless communication system, and more particularly, to a method for transmitting or receiving a signal on a subframe having a guard period (GP) for uplink/downlink transmission/reception switching of a base station and a user equipment (UE) and a device therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLCC has been discussed for next generation wireless communication.

DISCLOSURE

Technical Problem

An object of the present invention is to provide a method for transmitting or receiving a signal to improve efficiency in use of radio resources in a wireless communication system in which a self-contained subframe having all of a downlink control region, a data region, a guard period (GP) for transmission and reception switching and an uplink control region is used.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for transmitting a signal by a user equipment (UE) in a wireless communication system according to one aspect of the present invention comprises: receiving timing advance (TA) information on a self-contained subframe having all of a downlink control region, a downlink data region, a guard period (GP) for transmission/reception switching, and an uplink control region; and transmitting uplink control information by advancing transmission timing corresponding to the uplink control region by a time length indicated by the TA information, wherein, when the time length indicated by the TA information is less than a predetermined length, the UE first transmits a specific uplink signal, and then transmits the uplink control information at a residual duration of the GP, which remains after completion of the transmission/reception switching.

To achieve the object of the present invention, a UE in a wireless communication system according to another aspect of the present invention comprises a processor; a receiver for receiving timing advance (TA) information on a self-contained subframe having all of a downlink control region, a downlink data region, a guard period (GP) for transmission/reception switching, and an uplink control region; and a transmitter for transmitting uplink control information by advancing transmission timing corresponding to the uplink control region by a time length indicated by the TA information, wherein, when the time length indicated by the TA information is less than a predetermined length, the processor controls the transmitter to first transmit a specific uplink signal and then transmit the uplink control information at a residual duration of the GP, which remains after completion of the transmission/reception switching.

To achieve the object of the present invention, a method for receiving a signal by a base station in a wireless communication system according to still another aspect of the present invention comprises transmitting, to a UE, timing advance (TA) information indicating that transmission timing of the uplink control region should be moved forward, with respect to a self-contained subframe having all of a downlink control region, a downlink data region, a guard period (GP) for transmission/reception switching, and an uplink control region; receiving a specific uplink signal at a residual duration of the GP, which remains after completion of the transmission/reception switching when a time length indicated by the TA information is less than a predetermined length; and receiving uplink control information in the uplink control region after receiving the specific uplink signal.

According to further still another aspect of the present invention, a base station for performing the method for receiving a signal may be provided.

Preferably, the residual duration of the GP may be varied depending on the time length indicated by the TA information, and the UE may transmit the specific uplink signal if the residual duration of the GP is at least a half symbol duration or more.

Also, if the base station requests the UE to transmit the specific uplink signal at the residual duration of the GP when the time length indicated by the TA information is a predetermined length or more, the UE may receive downlink data by assuming that at least one symbol located at the end of the downlink data region has been punctured or rate matched by the base station. Also, before the GP is started, the UE may perform transmission and reception switching in at least one symbol of the downlink data region, which has been assumed to be punctured or rate matched.

Also, if the UE is not scheduled to receive downlink data, the UE may perform transmission and reception switching in the downlink data region located prior to the GP. Also, if the time length indicated by the TA information is a predetermined length or more and the UE is scheduled to receive downlink data, transmission of the specific uplink signal may be omitted.

Also, the UE may receive, from the base station, index or period information of self-contained subframes allowed to transmit the specific uplink signal on the residual duration of the GP.

Also, the specific uplink signal may be an uplink reference signal of which subcarrier spacing is twice greater than that of the other signals, or may be an uplink reference signal transmitted based on transmission comb.

Advantageous Effects

According to one embodiment of the present invention, in a wireless communication system in which a self-contained subframe having all of a downlink control region, a data region, a guard period (GP) for transmission and reception switching and an uplink control region is used, since a UE and a base station transmits or receives a signal on a residual GP considering a TA value and transmission and reception switching timing, efficiency deterioration in use of resources, which is caused by GP configured per subframe, may be overcome and system throughput may be improved.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
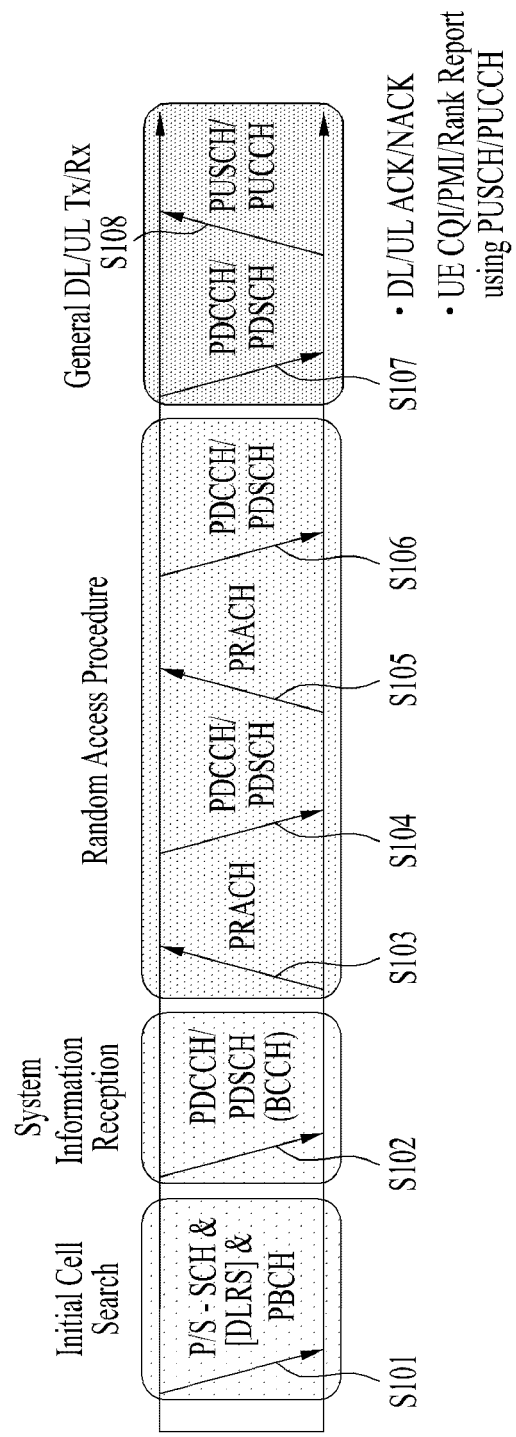
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
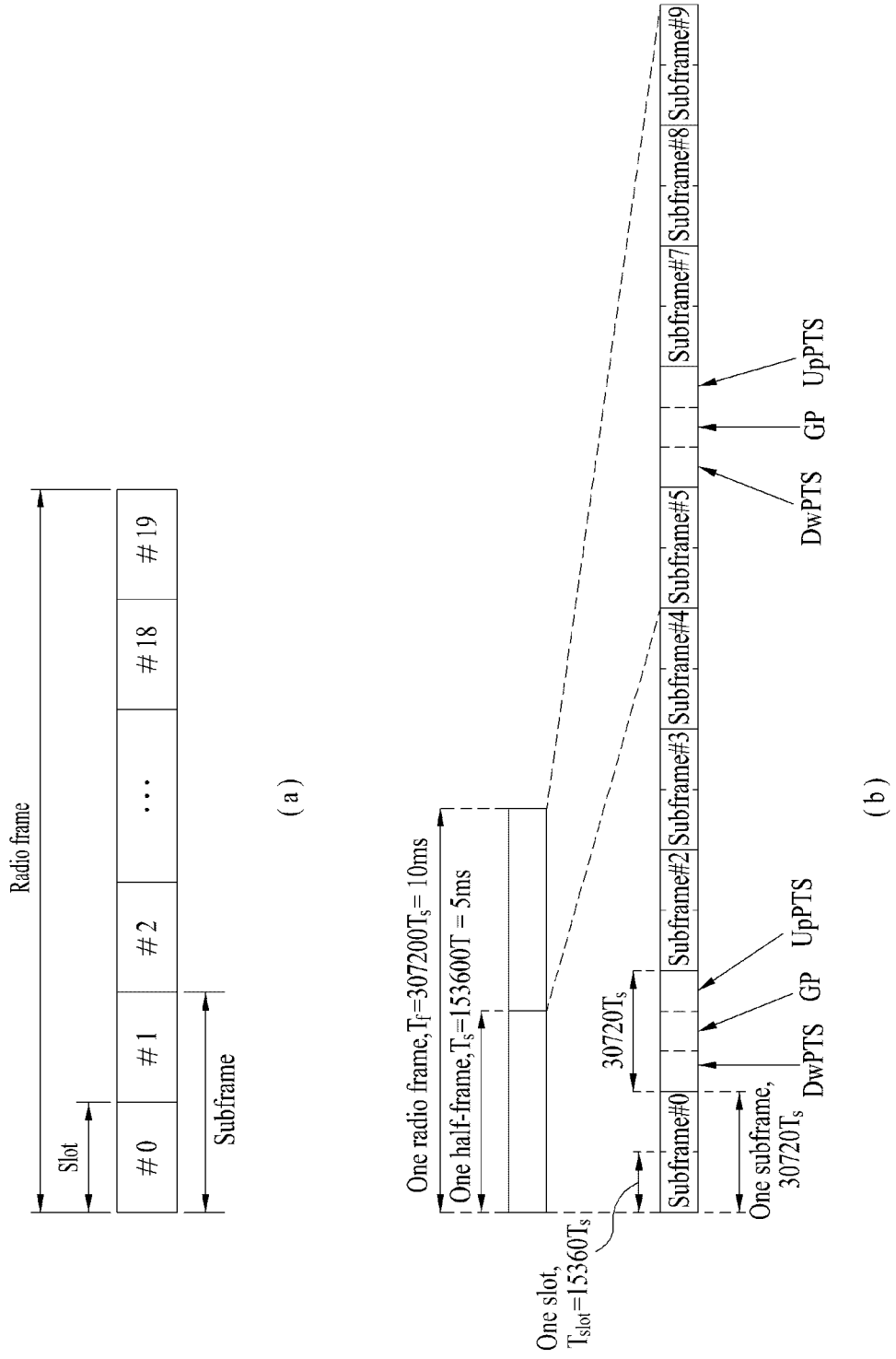
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
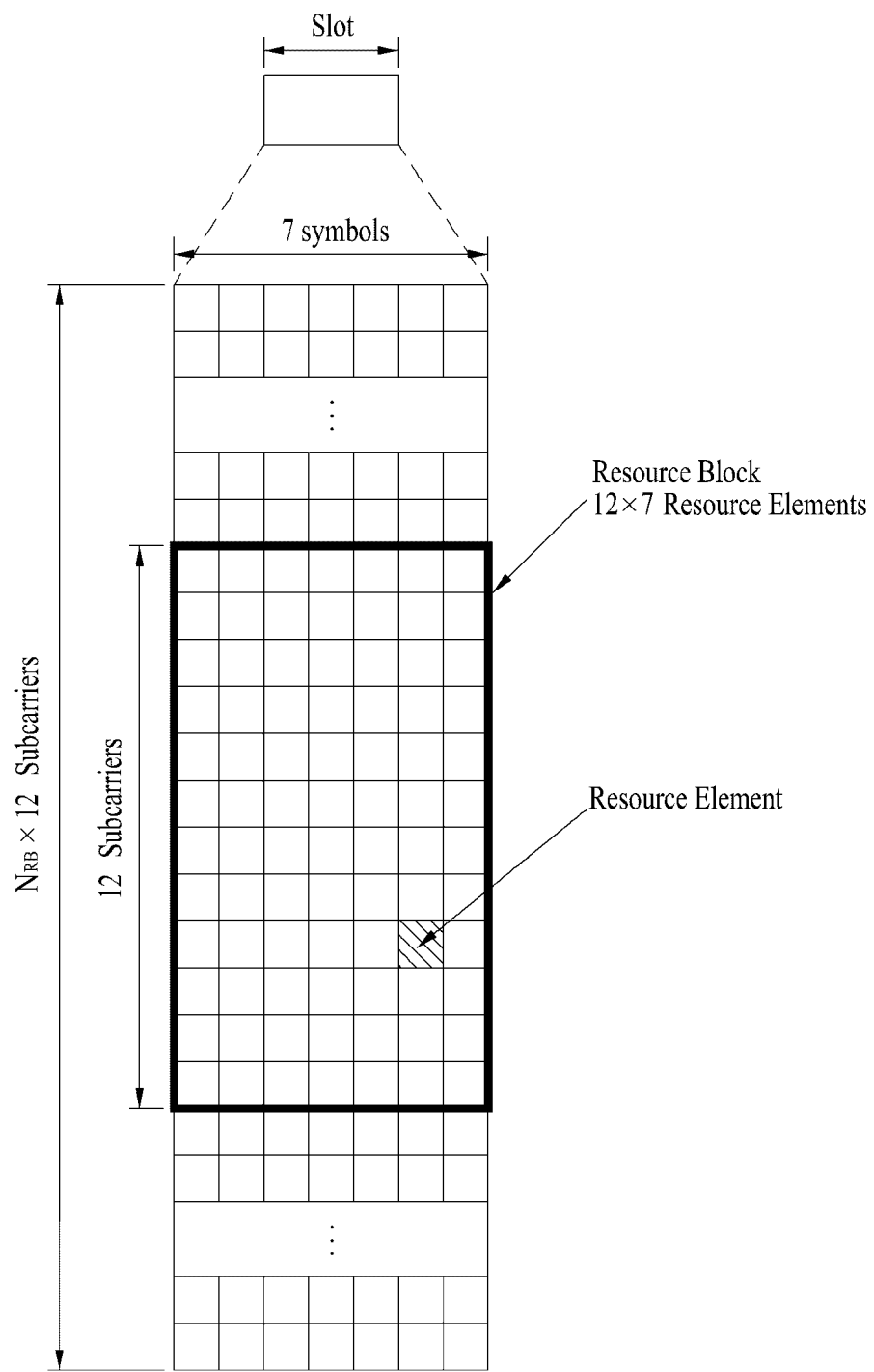
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
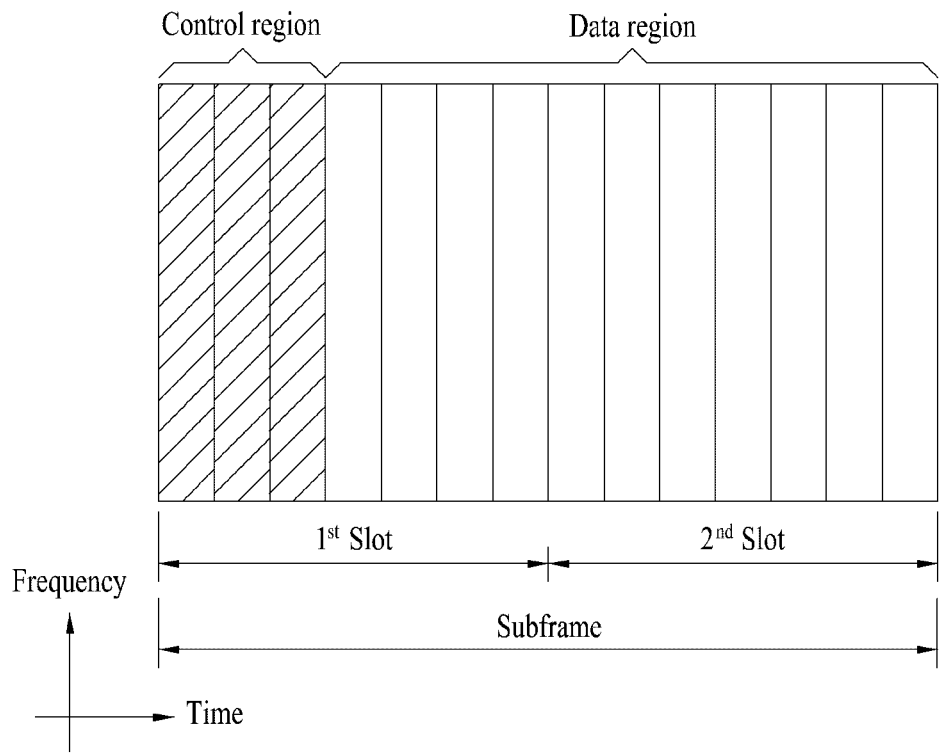
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information. UL transmit (Tx) power control command, and the like.

Figure 5:
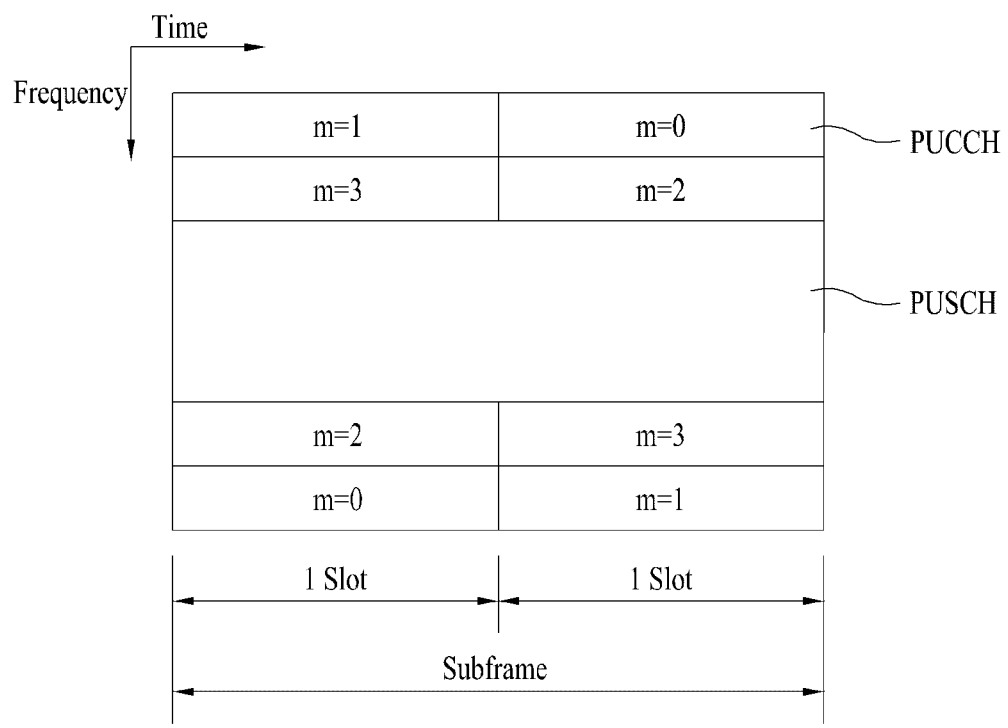
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR (Scheduling Request), HARQ-ACK and/or CSI (Channel State Information)s.

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
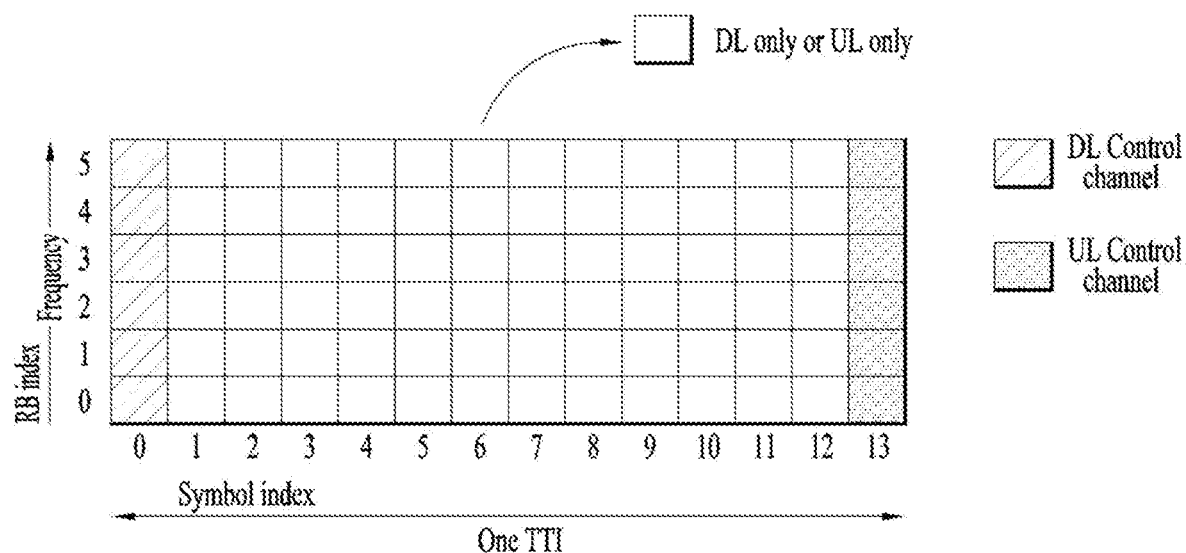
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, oblique line areas indicate downlink control regions and black colored areas indicate uplink control regions. Areas having no mark may be used for downlink data transmission or uplink data transmission.

In this self-contained subframe restructure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

UL/DL Transmission on Residual Resources of Self-Contained Subframe

The Self-contained subframe may be categorized into DL Self-contained subframe (hereinafter, DL subframe) and UL Self-contained subframe (hereinafter, UL subframe) in accordance with a direction of data transmitted at the corresponding subframe.

Figure 7:
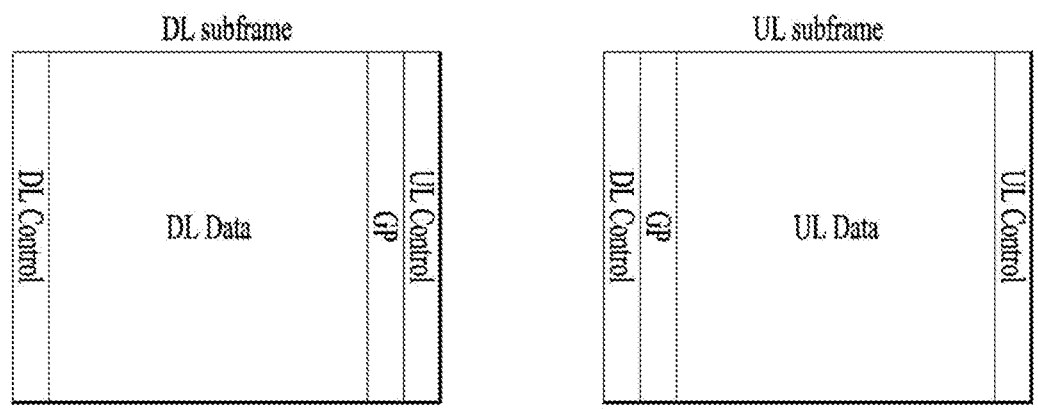
FIG. 7 is a diagram illustrating a downlink self-contained subframe and an uplink self-contained subframe according to one embodiment of the present invention.

FIG. 7 is a diagram illustrating a DL subframe and a UL subframe according to one embodiment of the present invention.

Referring to FIG. 7, the GP is located at the time when DL is switched to UL. For example, the GP is located between the DL data region and the UL control region at the DL subframe, and is located between the DL control region and the UL data region at the UL subframe.

The GP may include Tx/Rx switching time of the eNB/UE and a timing advance (TA) for UL transmission of the UE.

According to the frame structure 2 (i.e., TDD frame) of the legacy LTE system, if UL subframe is arranged after DL subframe, a special subframe is configured between the DL subframe and the UL subframe. The special subframe is intended to compensate for UL/DL switching time and TA, and one to two special subframes are included in one TDD frame in accordance with UL-DL configuration.

Meanwhile, in case of the self-contained subframe structure considered in the new RAT, since regions for UL/DL transmission are included in one subframe, the GP should be inserted to every subframe. If the GP is inserted to all subframes, a problem occurs in that efficiency in use of radio resources is deteriorated.

According to one embodiment of the present invention, a method for performing UL/DL transmission within a GP to reduce resource waste due to the GP of a self-contained subframe is suggested.

Figure 8:
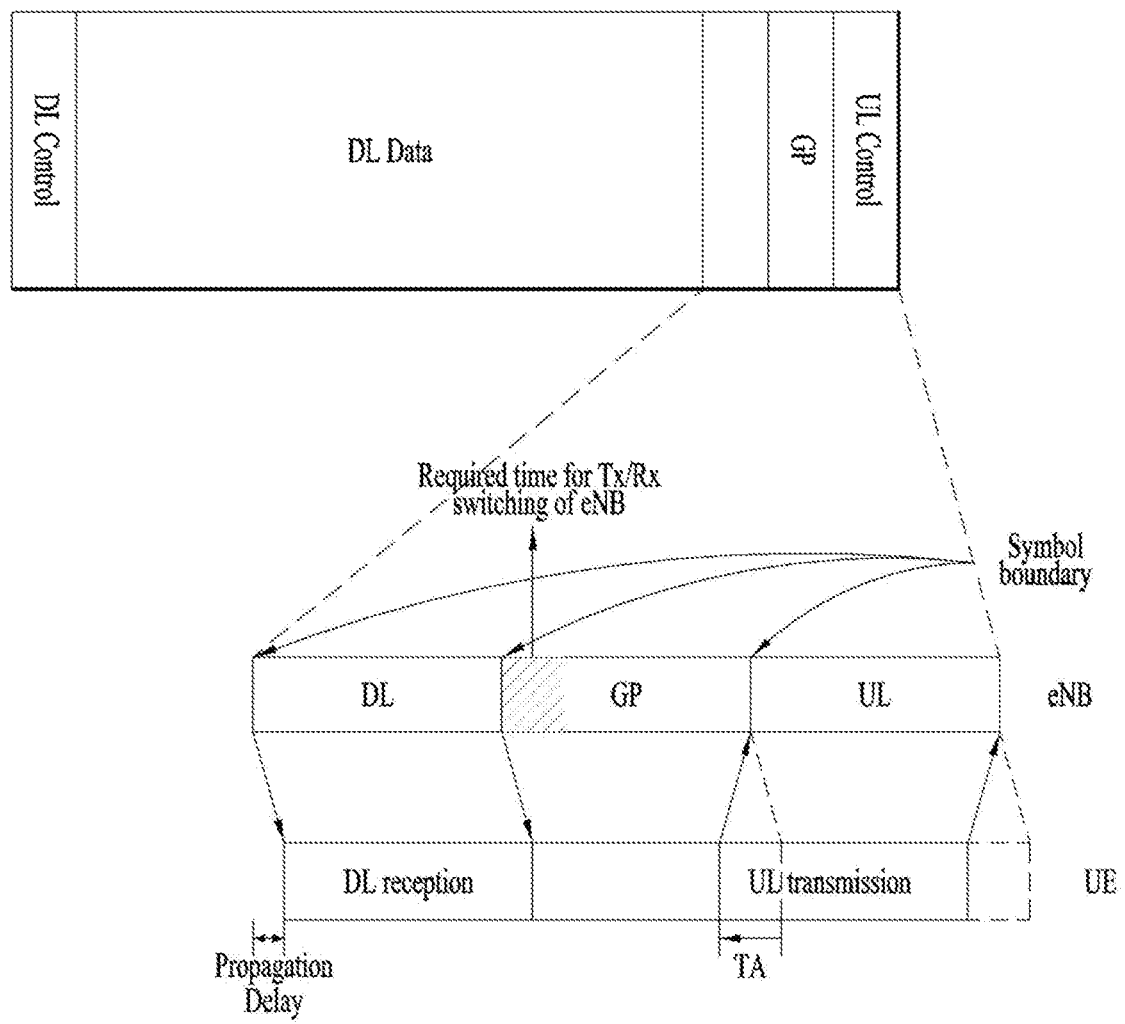
FIG. 8 is a diagram illustrating a residual GP issued in a self-contained subframe.

FIG. 8 is a diagram illustrating transmission and reception timing of the eNB and the UE at the DL subframe. In detail, FIG. 8 illustrates transmission timing/reception timing of the eNB and the UE with respect to the last three symbols among DL subframes. For convenience, it is assumed that the GP corresponds to one symbol and the UL control region also corresponds to one symbol. However, the present invention is not limited to this example.

Referring to FIG. 8, DL data transmitted from the eNB is delayed for a certain time by propagation delay and then received by the UE. Also, if the UE transmits UL signal, the UE should transmit UL signal in advance as much as TA to adapt to UL reception timing of the eNB. For example, the UE should transmit UL signal earlier than UL symbol known by itself as much as TA such that the eNB may normally receive UL signal from the UL symbol.

On a timeline of the eNB of FIG. 8, supposing that an oblique area within the GP symbol is Tx/Rx switching time, the other period of the GP symbol may be regarded as a period where the eNB may receive UL signal.

Uplink Transmission within GP Symbol(s)

One embodiment of the present invention suggests that the eNB performs transmission and reception of UL signal in an area where UL signal reception is available among the aforementioned GP area (e.g., one or more GP symbols allocated for GP) to improve resource efficiency.

The UL signal transmitted from the GP area (e.g., GP symbol) may be UL data or reference signal, for example. Also, UL transmission on the GP area may be one symbol transmission or half symbol transmission. For example, half symbol transmission may be transmission for all frequency resources of an area given on a frequency domain, and may be performed by transmission in the form of Comb. Meanwhile, half symbol transmission on a time domain may be, but not limited to, signal transmission for a time period corresponding to GP symbol(s) length*½ which is actually given. That is, half symbol transmission may mean signal transmission for a time period smaller than one symbol or signal transmission using a part of the GP.

RS transmitted from the GP area may be RS for measuring UL channel quality by means of the eNB. Also, a range of a resource to which a specific UE may transmit RS may be determined by the eNB. For example, the eNB may indicate, to the corresponding UE, to transmit RS to a frequency domain (e.g., 6 RBs) corresponding to UL resource scheduled to the corresponding UE or transmit RS to a bull band (e.g., 100 RBs) to obtain channel quality information on a full system band, or may indicate RS transmission for a specific region.

The eNB may indicate, to the UE, to perform UL transmission (e.g., half symbol UL transmission) at GP symbol (s).

For example, the eNB may indicate, to the UE which does not perform DL reception at a symbol prior to the GP symbol, half symbol UL transmission from GP symbol. Alternatively, the eNB may indicate, to the UE having a sufficient resource for performing UL transmission, half symbol UL transmission at the GP symbol due to a small TA value even except Tx/Rx switching time of the eNB/UE within GP symbol.

Alternatively, the UE which performs UL transmission at the GP symbol or the UE which is indicated from the eNB to perform UL transmission from the GP symbol may perform Tx/Rx switching instead of performing DL reception at the corresponding DL symbol by assuming that DL symbol located prior to the GP symbol has been punctured or rate matched.

Figure 9:
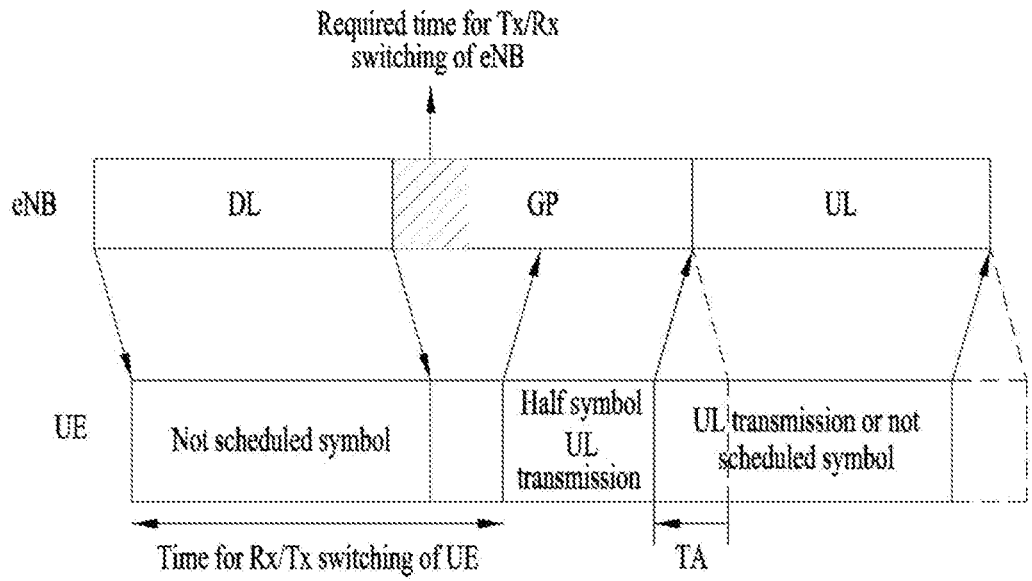
FIGS. 9 to 12 are diagrams illustrating methods for transmitting UL signal in a residual GP of a downlink self-contained subframe according to the embodiments of the present invention.

FIG. 9 illustrates UL signal transmission on the GP symbol according to one embodiment of the present invention. In FIG. 9, it is assumed that the UE does not receive DL data at the corresponding DL subframe or does not receive DL data on a specific number of DL symbols located prior to the GP symbol.

The UE scheduled to perform UL transmission at the GP of the corresponding DL subframe may perform Tx/Rx switching at the time prior to UL transmission and perform UL transmission for at least a part of the GP. The time prior to UL transmission is a period where transmission and reception operation is not performed, and for example, may be a residual resource within the GP or DL symbol located prior to the GP symbol.

Referring to FIG. 9, the UE which does not receive DL data initiates Rx-to-Tx switching at the DL symbol and completes Rx-to-Tx switching prior to end timing of the GP moved forward as much as TA. Therefore, the UE may perform UL transmission until the end timing of the GP moved forward as much as TA from the time when the UE completes Rx-to-Tx switching at the GP.

Figure 10:
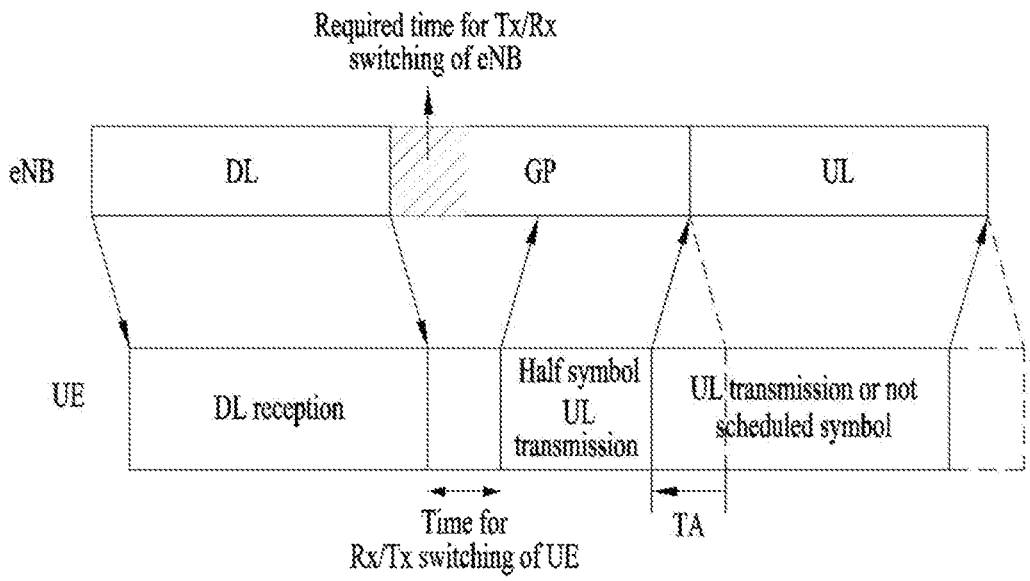

FIG. 10 illustrates that the UE which receives DL data transmits UL signal on the GP symbol. Referring to FIG. 10, it is assumed that the UE receives DL data at the DL symbol located prior to the GP but a residual resource exists in the GP due to a sufficiently short TA and a sufficiently short Rx/Tx switching time of the UE.

Referring to FIG. 10, the UE completes DL reception and initiates Rx-to-Tx switching. Also, the UE completes Rx-to-Tx switching prior to end timing of the GP moved forward as much as TA. Therefore, the residual resource within the GP may be represented by "original GP end timing'—'TA value'—'Rx to Tx switching end timing'. Therefore, if the TA value is small and Rx to Tx switching is completed quickly, the residual resource within the GP is increased.

To perform UL symbol transmission in the GP, a residual resource of at least a certain time or more should be ensured. This is because that validity of UL transmission may be deteriorated and complexity in implementation and processing may be increased even though UL transmission is performed in the corresponding residual resource if a length of the residual resource is too short even in case of the presence of the residual resource.

Therefore, if the TA value is sufficiently small and Rx-to-Tx switching is quickly performed, even the UE which receives DL data may perform UL transmission from at least a part of the GP. In other words, in order that the UE which receives DL data performs UL transmission from at least a part of the GP, a condition of Equation 1 needs to be satisfied.

$$TA\ Value + SwitchingTime < Threshold \qquad [\text{Equation 1}]$$

In the Equation 1, the TA Value is a value determined in accordance with a wireless communication environment (e.g., eNB-to-UE distance, propagation transfer path, mobility, etc.) between the eNB and the UE, and the eNB may indicate, to the UE, the TA value to synchronize an uplink (e.g., random access procedure or TA compensation procedure at a later RRC connected state). The SwitchingTime is the time required by the UE for Rx-to-Tx switching, and may be actual Rx-to-Tx switching time varied depending on individual UE capability or maximum time (e.g., Nominal Rx-to-Tx switching time) of Rx-to-Tx switching defined by requirements of a new RAT UE.

If the SwitchingTime is actual Rx-to-Tx switching time of the corresponding UE, each UE may report its actual Rx-to-Tx switching time to the eNB. Afterwards, the eNB may indicate, to the corresponding UE, to perform UL transmission from the residual resource of the GP if TA value of the UE+reported Rx-to-Tx switching time is less than a predetermined threshold value. Alternatively, the UE may be configured to perform UL transmission from the residual resource of the GP if TA value acquire from the eNB+Rx-to-Tx switching time of the UE is less than a predetermined threshold value.

Meanwhile, supposing that the SwitchingTime is a constant (e.g., Nominal Rx-to-Tx switching time) determined in accordance with UE category, whether the UE which receives DL data may perform UL transmission from at least a part of the GP may be determined in accordance with the TA value. For example, the UE may be configured to perform UL transmission from the residual resource of the GP if the TA value acquired from the eNB is less than the predetermined threshold value. Alternatively, the eNB may indicate, to the UE, to perform UL transmission from the residual resource of the GP if the TA value of the corresponding UE is less than the predetermined threshold value.

If the residual CP is not ensured sufficiently due to a long TA and a long Rx-to-Tx switching time, UL transmission on the GP may not be performed.

Figure 11:
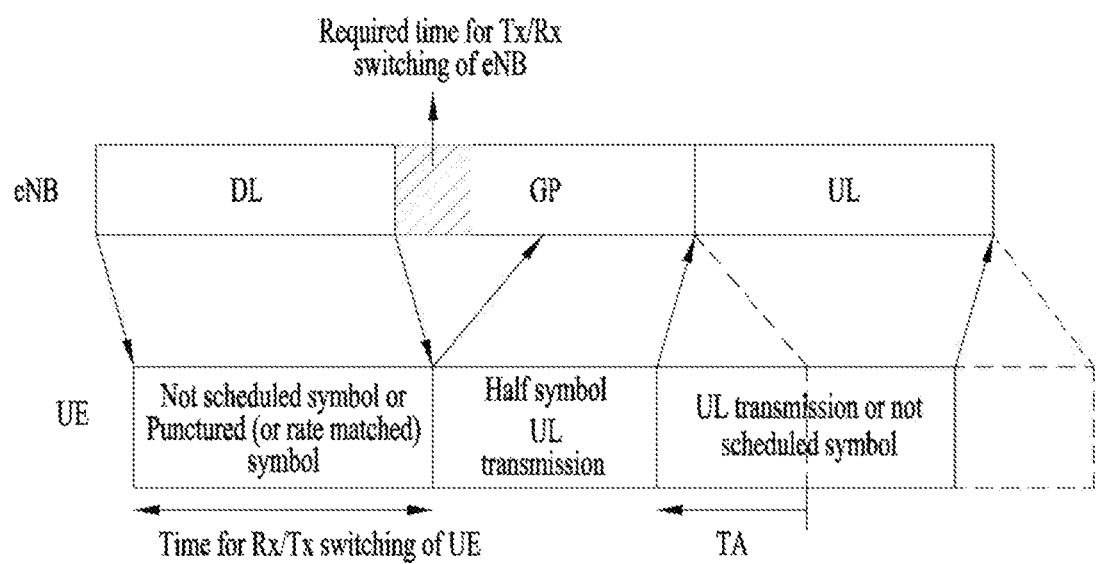

For another example, if the residual CP is not ensured sufficiently due to a long TA and a long Rx-to-Tx switching time, Rx-to-Tx switching may be performed prior to the GP as shown in FIG. 11.

FIG. 11 illustrates that additional GP is required for the corresponding UE due to a long TA of the UE and/or a long Rx-to-Tx switching time. If the UE is not scheduled to deceive DL data at the DL symbol prior to the GP symbol, the UE may perform Rx/Tx switching in the DL data region similarly to the description of FIG. 9. The UE may complete Rx/Tx switching in the DL data region and transmit UL signal from the GP reduced as much as TA.

Unlike the above case, if the UE is scheduled to receive DL data at the DL symbol prior to the GP symbol, the UE may receive the DL data by assuming that the corresponding DL symbol (e.g., last DL symbol(s)) has been rate matched or punctured. The DL symbol where the DL data has been rate matched or punctured may be used for Rx/Tx switching and/or TA. Since the UE assumes that the DL data has been rate matched or punctured at the last n DL symbols required for Rx/Tx switching, reception of the DL data is completed prior to ending of the DL data region.

At this time, whether the DL symbol located prior to the GP symbol has been rate matched or punctured may be signaled explicitly or indicated implicitly by the eNB. In case of implicit indication, the UE may assume that the DL symbol(s) prior to the GP has been rate matched if DL data reception and UL transmission on the GP are scheduled simultaneously.

It may be assumed that the aforementioned method for half symbol transmission is applied when the Tx/Rx switching time of the eNB is shorter than ½ symbol. Also, the eNB may broadcast its Tx/Rx switching time through system information, etc.

If the Tx/Rx switching time of the eNB exceeds ½ symbol duration, it may be assumed that the method for half symbol transmission is not applied within coverage of the corresponding eNB.

Alternatively, to simplify transmission and reception timing of the DL/UL signal, the UE indicated to perform UL transmission in the GP may previously be defined to assume that there is no DL scheduling at the corresponding subframe and omit decoding for DL DCI.

Figure 12:
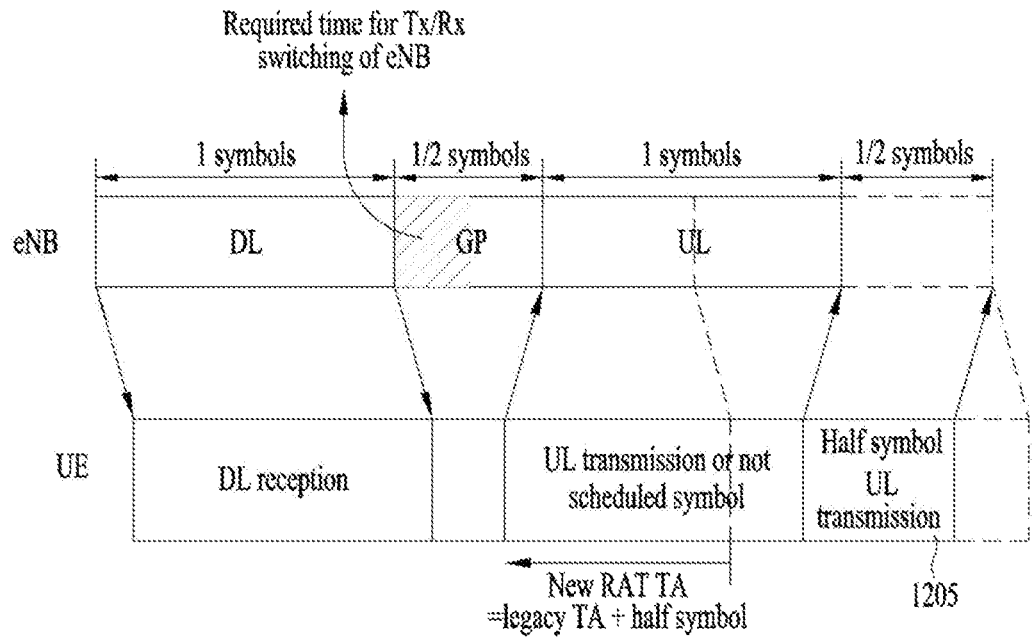

FIG. 12 illustrates another example of UL transmission performed from a part of the GP.

Referring to FIG. 12, as another method for reducing resource waste caused by GP, a residual resource 1205 ensured using TA (e.g., New RAT TA=legacy TA+half symbol duration) may be used for uplink transmission.

For example, the eNB may reduce the GP by using TA (e.g., New RAT TA). Referring to a timeline of the UE, as a relatively great TA value is signaled to the UE, the GP of the UE has been relatively early ended, and the UL symbol of the UE has been relatively early started/ended. Therefore, a residual space of a half symbol may be ensured behind the UL symbol, and may be used for UL transmission.

For the above operation, the eNB signals TA determined considering a length of a half symbol and propagation delay of the corresponding UE to the corresponding UE. As a result, the eNB may indicate, to the UE, to make a residual resource at the end of the subframe and perform half symbol UL transmission from the residual resource.

This method may be effective when one UE exclusively uses a full system band or in an environment, such as a small cell, where propagation delay is sufficiently small.

The examples of the aforementioned method for half symbol uplink transmission are categorized for convenience of description, and each example does not always configure an independent invention, and combination of the examples may be implemented as one invention.

Downlink Transmission within GP Symbol(s)

Although the above description has been given based on UL transmission on the GP, the present invention is limited to UL transmission on the GP, and the above-described methods may be used for DL transmission on the GP.

Figure 13:
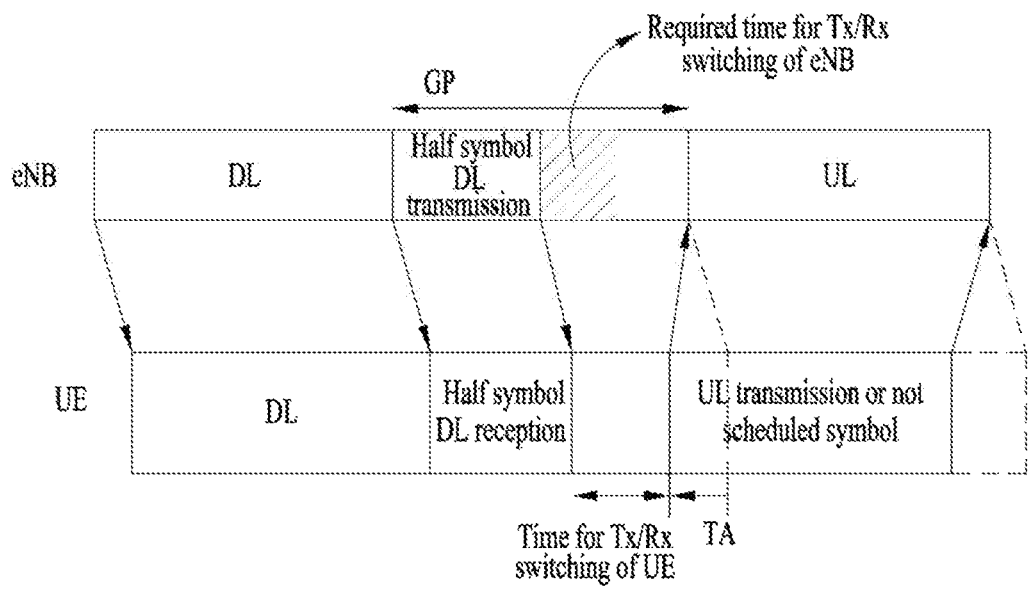
FIG. 13 is a diagram illustrating methods for transmitting DL signal in a residual GP of an uplink self-contained subframe according to one embodiment of the present invention.

FIG. 13 illustrates half symbol DL transmission on the GP according to one embodiment of the present invention.

In the same manner as half symbol UL transmission, RS or DL data may be transmitted and received from the residual resource on the GP.

To this end, each UE may report the time required for Tx/Rx switching to the eNB. Report of actual Tx/Rx switching time, which is varied in accordance with UE capability, to the eNB may mean that the method for half symbol transmission is determined to be performed UE-specifically. For example, since interference characteristic may be generated in the corresponding GP differently from normal DL symbol, RS for signal related measurement such as RSRP may be transmitted.

DL/UL transmission and reception on the suggested GP may be scheduled by control signaling such as DL assignment/UL grant, or may previously be configured for periodic transmission.

For example, UL transmission on the GP may be used for ACK/NACK transmission for DL data reception of the corresponding frame. The eNB may indicate (e.g., downlink control information included in the DL control region) to report ACK/NACK for DL during DL data scheduling by using half symbol transmission at a subframe. If timing for transmitting ACK/NACK is previously defined (e.g., ACK/NACK is configured to be transmitted after a certain time from the time when DL data is received) and half symbol transmission is available at the timing for transmitting ACK/NACK, the UE may be configured to transmit ACK/NACK through half symbol transmission. Alternatively, the eNB may indicate, to the UE, to perform half symbol transmission of UL RS (e.g., sounding reference signal) at a specific subframe or perform half symbol transmission of UL RS at a certain period.

In one embodiment of the present invention, a symbol structure in which half symbol is configured may be defined for half symbol transmission. For example, as a subcarrier spacing in a region for half symbol transmission is increased to twice of a subcarrier spacing for one normal symbol transmission, a symbol duration on the time domain may be reduced to ½. Also, half symbol transmission may be implemented by comb type signal transmission (e.g., similarly to LTE SRS).

As another method for half symbol transmission, meaningful data (e.g., UL data to be actually transmitted by the UE) may be mapped into the latter half of DFT input in SC-OFDM scheme. For example, the UE indicated to perform UL transmission at the GP may assume that DL symbol prior to the GP is not used for DL data transmission. Although the UE performs one symbol in accordance with GP timing in view of the eNB, the eNB may receive only ½ symbol of the latter half during one symbol transmission. At this time, one symbol transmission of the UE may include Tx/Rx switching and TA of the UE. For example, although the UE assumes one symbol transmission, the first half of the corresponding symbol may not be transmitted by Tx/Rx switching and TA of the UE. For another example, since data mapped into the first half of DFT input will be transmitted from a resource where the eNB performs Tx/Rx switching on a time axis, the UE may map dummy data (e.g., 0 padding) into the first half of DFT input by assuming that the eNB does not receive the data mapped into the first half of DFT input.

Figure 14:
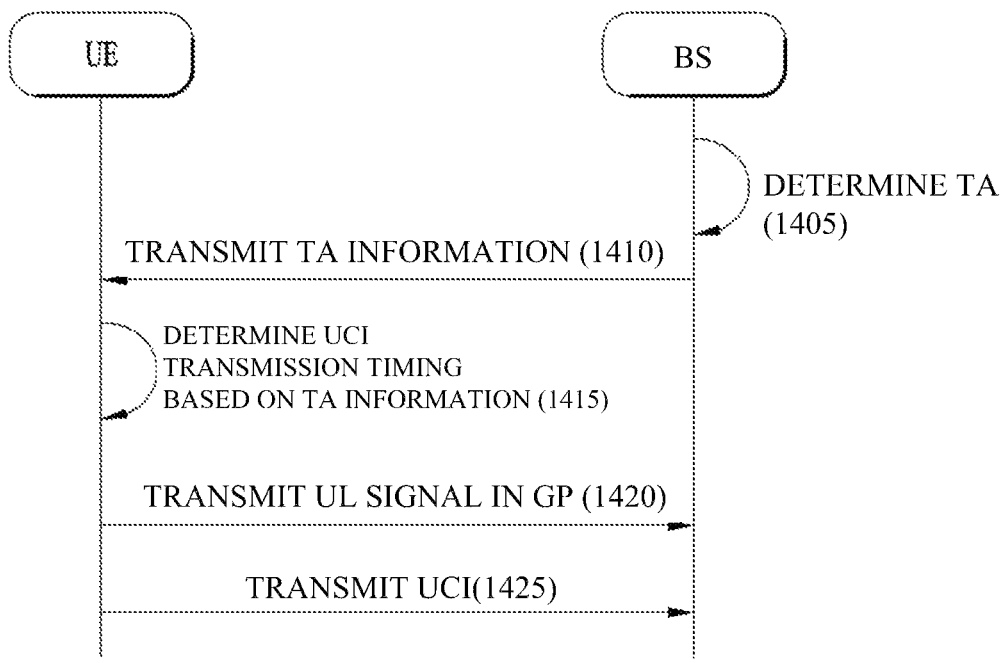
FIG. 14 is a diagram illustrating a flow of a method for transmitting or receiving a signal in accordance with one embodiment of the present invention.

FIG. 14 is a diagram illustrating a flow of a method for transmitting or receiving a signal in accordance with one embodiment of the present invention. Description repeated with the aforementioned description will be omitted.

Referring to FIG. 14, the base station determines TA (timing advance) information (1405). The TA information may be for a self-contained subframe having all of a downlink control region, a downlink data region, a GP (guard period) for transmission and reception switching, and an uplink control region. The eNB may determine a time length which will be indicated by the TA information on the basis of an uplink signal received from the UE. The uplink signal which will be used for TA determination may include, but is not limited to, a random access preamble during a random access procedure. The time length indicated by the TA information indicates how transmission timing of the UE corresponding to the uplink control region included in the self-contained subframe should be moved forward to allow the base station to normally receive corresponding uplink control information. That is, the TA information is related to uplink synchronization between the base station and the UE.

The eNB transmits the determined TA information to the UE (1410).

The UE may determine timing of UL control transmission on the basis of the received TA information (1415).

If the time length indicated by the TA information is less than a predetermined length, the UE may transmit the uplink control information (1425) after first transmitting a specific uplink signal at a residual duration of the GP remaining after transmission and reception switching is completed (1420).

The residual duration of the GP may be varied depending on the time length indicated by the TA information. The UE may transmit a specific uplink signal if the residual duration of the GP is at least a predetermined threshold value (e.g., half symbol duration) or more.

If the base station requests the UE to transmit the specific uplink signal at the residual duration of the GP even though the time length indicated by the TA information is a predetermined length or more, the UE may receive downlink data by assuming that at least one symbol located at the end of the downlink data region has been punctured or rate matched by the base station. Also, before the GP is started, the UE may perform transmission and reception switching in at least one symbol of the downlink data region, which has been assumed to be punctured or rate matched.

If the UE is not scheduled to receive downlink data, the UE may perform transmission and reception switching in the downlink data region located prior to the GP.

Also, if the time length indicated by the TA information is a predetermined length or more and the UE is scheduled to receive downlink data, transmission of the specific uplink signal may be omitted.

The UE may receive, from the base station, index or period information of self-contained subframes allowed to transmit the specific uplink signal on the residual duration of the GP.

The specific uplink signal may be an uplink reference signal of which subcarrier spacing is twice greater than that of the other signals, or may be an uplink reference signal transmitted based on transmission comb.

Figure 15:
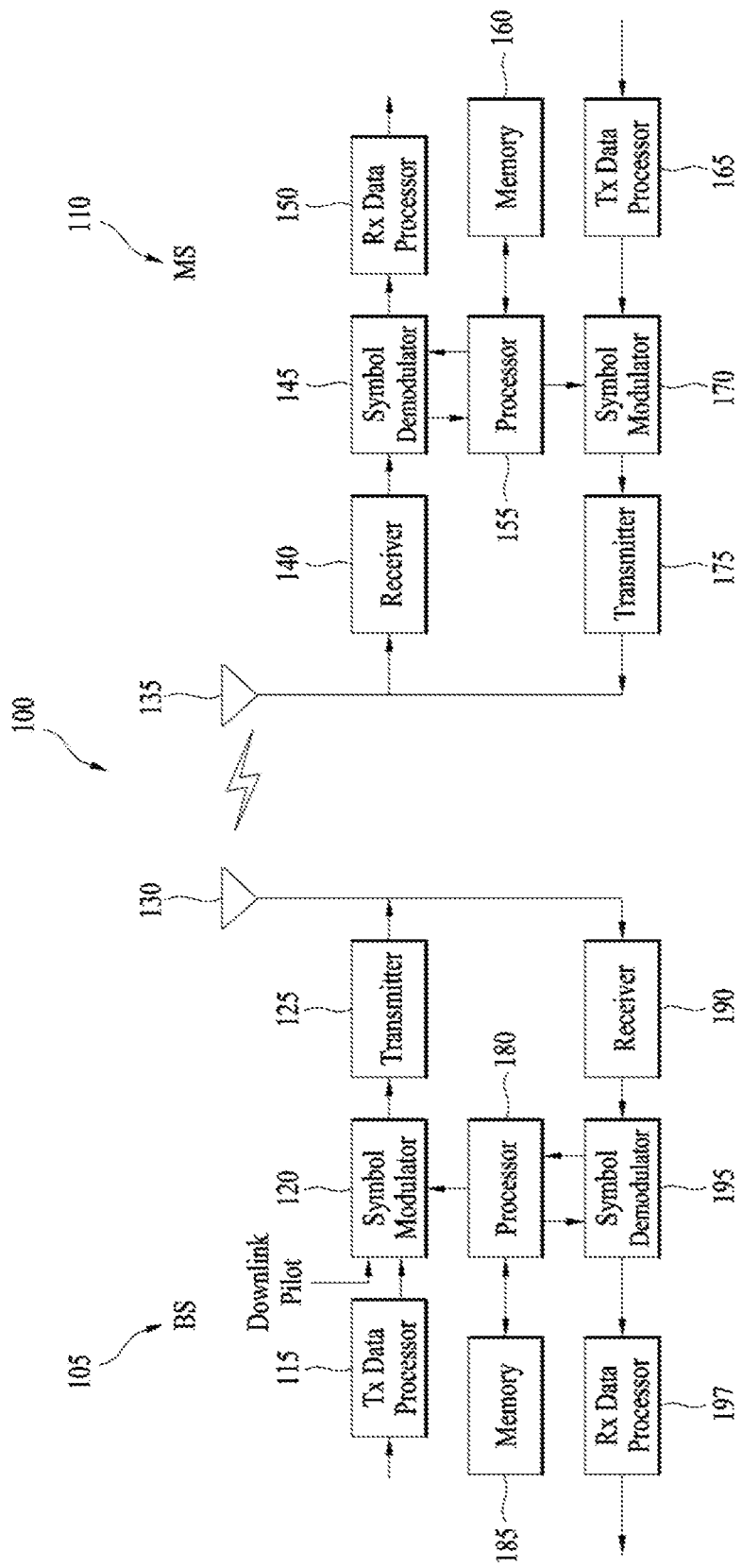
FIG. 15 is a diagram illustrating a UE and a base station according to one embodiment of the present invention.

FIG. 15 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 15, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present invention supports an MIMO (multiple input multiple output) system. And, the eNB 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

The invention claimed is:

1. A method for transmitting a signal by a user equipment (UE) in a wireless communication system, the method comprising:
receiving timing advance (TA) information on a self-contained subframe having all of a downlink control region, a downlink data region, a guard period (GP) for transmission/reception switching, and an uplink control region; and
transmitting uplink control information by advancing transmission timing corresponding to the uplink control region by a time length indicated by the TA information,
wherein when the time length indicated by the TA information is less than a predetermined length, the UE first transmits a specific uplink signal and then transmits the uplink control information at a residual duration of the GP, which remains after completion of the transmission/reception switching, and
wherein the residual duration of the GP is varied depending on the time length indicated by the TA information, and the UE transmits the specific uplink signal if the residual duration of the GP is at least a half symbol duration or more.

2. The method according to claim 1, wherein, if a base station requests the UE to transmit the specific uplink signal at the residual duration of the GP when the time length indicated by the TA information is the predetermined length or more, the UE receives downlink data by assuming that at least one symbol located at an end of the downlink data region has been punctured or rate matched by the base station.

3. The method according to claim 2, wherein, before the GP is started, the UE performs the transmission/reception switching in at least one symbol of the downlink data region, which has been assumed to be punctured or rate matched.

4. The method according to claim 1, wherein, if the UE is not scheduled to receive downlink data, the UE performs transmission/reception switching in the downlink data region located prior to the GP.

5. The method according to claim 4, wherein, if the time length indicated by the TA information is the predetermined length or more and the UE is scheduled to receive downlink data, transmission of the specific uplink signal is omitted.

6. The method according to claim 1, further comprising:
receiving index or period information of self-contained subframes allowed to transmit the specific uplink signal on the residual duration of the GP.

7. The method according to claim 1, wherein the specific uplink signal is an uplink reference signal of which subcarrier spacing is twice greater than that of other signals, or the specific uplink signal is an uplink reference signal transmitted based on transmission comb.

8. A user equipment (UE) in a wireless communication system, the UE comprising:
a processor;
a receiver configured to receive timing advance (TA) information on a self-contained subframe having all of a downlink control region, a downlink data region, a guard period (GP) for transmission/reception switching, and an uplink control region; and
a transmitter configured to transmit uplink control information by advancing transmission timing corresponding to the uplink control region by a time length indicated by the TA information,
wherein when the time length indicated by the TA information is less than a predetermined length, the processor controls the transmitter to first transmit a specific uplink signal and then transmit the uplink control information at a residual duration of the GP, which remains after completion of the transmission/reception switching, and
wherein the residual duration of the GP is varied depending on the time length indicated by the TA information, and the processor controls the transmitter to transmit the specific uplink signal if the residual duration of the GP is at least a half symbol duration or more.

9. A method for receiving a signal by a base station in a wireless communication system, the method comprising:
transmitting, to a user equipment (UE), timing advance (TA) information indicating that transmission timing of an uplink control region should be moved forward, with respect to a self-contained subframe having all of a downlink control region, a downlink data region, a guard period (GP) for transmission/reception switching, and the uplink control region;
receiving a specific uplink signal at a residual duration of the GP, which remains after completion of the transmission/reception switching when a time length indicated by the TA information is less than a predetermined length; and
receiving uplink control information in the uplink control region after receiving the specific uplink signal,
wherein the residual duration of the GP is varied depending on the time length indicated by the TA information, and the base station receives the specific uplink signal if the residual duration of the GP is at least a half symbol duration or more.

10. The method according to claim 9, wherein, if the time length indicated by the TA information is the predetermined length or more, the base station performs puncturing or rate matching for at least one symbol located at an end of the downlink data region and transmits downlink data.

11. The method according to claim 9, wherein, if the time length indicated by the TA information is the predetermined length or more and the UE is scheduled to receive downlink data, transmission of the specific uplink signal is omitted.

12. The method according to claim 9, further comprising:
transmitting, to the UE, index or period information of self-contained subframes allowed to transmit the specific uplink signal on the residual duration of the GP.

13. The method according to claim 9, wherein the specific uplink signal is an uplink reference signal of which subcarrier spacing is twice greater than that of other signals, or the specific uplink signal is an uplink reference signal transmitted based on transmission comb.

* * * * *